United States Patent [19]
Minowa et al.

[11] Patent Number: 6,104,496
[45] Date of Patent: *Aug. 15, 2000

[54] PRINTER AND CONTROL METHOD THEREFOR

[75] Inventors: Masahiro Minowa; Yoshikazu Ito; Masayo Miyasaka; Kazunari Yawata, all of Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,394

[22] Filed: Sep. 25, 1997

Related U.S. Application Data

[63] Continuation-in-part of application No. 08/923,352, Sep. 4, 1997, which is a continuation-in-part of application No. 08/708,598, Sep. 5, 1996, Pat. No. 5,692,110, which is a continuation-in-part of application No. 08/397,009, Mar. 1, 1995, Pat. No. 5,555,349, which is a continuation-in-part of application No. 08/139,627, Oct. 20, 1993, Pat. No. 5,437,004, which is a continuation-in-part of application No. 07/902,318, Jun. 22, 1992, abandoned.

[30] Foreign Application Priority Data

| Jun. 21, 1991 | [JP] | Japan | 3-150312 |
| Feb. 20, 1992 | [JP] | Japan | 4-33411 |
| Sep. 25, 1996 | [JP] | Japan | 8-252774 |

[51] Int. Cl.[7] ............................................. G06K 15/00
[52] U.S. Cl. ................................. 358/1.12; 358/1.13
[58] Field of Search ............................... 395/101, 102, 395/105, 111, 112, 113, 114, 115; 399/367, 370, 371, 376, 388, 389, 396, 361; 358/296, 305, 449; 400/595, 596, 434

[56] References Cited

U.S. PATENT DOCUMENTS

| 4,614,949 | 9/1986 | Hakkaka et al. . |
| 4,933,772 | 6/1990 | Ikenoue et al. .......................... 398/300 |
| 4,939,554 | 7/1990 | Hirabayashi et al. .................. 355/317 |
| 4,998,216 | 3/1991 | Hino et al. . |
| 5,075,874 | 12/1991 | Steeves et al. . |
| 5,437,004 | 7/1995 | Miyasaka et al. . |
| 5,555,349 | 9/1996 | Miyasaka et al. . |

FOREIGN PATENT DOCUMENTS

| 027561 | 4/1981 | European Pat. Off. . |
| 3516374 | 11/1985 | Germany . |
| 57-176187 | 10/1982 | Japan . |
| 2-59067 | 11/1990 | Japan . |

*Primary Examiner*—Arthur G. Evans
*Attorney, Agent, or Firm*—Eric B. Janofsky

[57] ABSTRACT

A printer capable of printing on differing types of recording media. A memory section is provided that is capable of storing insertion wait times that wait for insertion of the respective recording medium types and setting wait times that wait for the recording medium to be properly set. Also, when the type of recording medium to be printed on is designated, then the printer waits for insertion of the recording medium according to the insertion wait time and setting wait time corresponding to that recording medium and then starts an automatic feed operation. Therefore, it is possible to offer a printer and its control method wherein the wait times can be set according to the level of experience of the operator and to the recording paper types, the ease of use of the recording medium and the installation circumstances of the printer, setting times can be set that do not cause stress on the operators, and printing can be performed without wasted time.

22 Claims, 6 Drawing Sheets

PRINTER AND CONTROL METHOD THEREFOR

This is a continuation-in-part of Ser. No. 08/923,352 filed Sep. 4, 1997 (by Express Mail Label No. EM044169813US and identified by Applicants' attorney as P1646.C4), which is a continuation of Ser. No. 708,598 filed Sep. 5, 1996, which is a continuation of Ser. No. 08/397,009, filed Mar. 1, 1995, now U.S. Pat. No. 5,555,349, which is a continuation of Ser. No. 08/139,627 filed Oct. 20, 1993, now U.S. Pat. No. 5,437,004, which is a continuation of Ser. No. 08/902,318, filed Jun. 22, 1992, abandoned, the contents of each of which are incorporated herein by reference.

BACKGROUND OF THE INVENTION

1. Field of the Invention

This invention relates generally to a printer capable of printing data received from a host computer on slip forms, validation forms and other different types of recording media and to its control method.

2. Description of the Related Art

Printers capable of printing on a plurality of different types of cut sheet recording media (stock forms) such as slip forms including multilayer copy paper and standard thicker validation forms are used as POS printers. In the prior art, when a cut sheet form or recording medium was placed in the entrance of the paper path of these kinds of printers, the printer would generally detect it and then automatically feed the recording medium either immediately or after a predetermined time period and start printing.

However, even though the recording medium has been properly set in these kinds of printers, it either takes too long for it to be fed and printing to start, or the recording medium is fed and printing starts even if it has not been properly set. In the printers used in cash registers, the time it takes to properly set the recording medium will vary depending on the skill and experience of the operator, and therefore the time it takes for automatic feed to start after the recording medium has been set may seem long or short depending on the level of training. Moreover, the difficulty of setting the recording medium will vary depending on its size and thickness or the printing position, and therefore the suitable waiting time will vary depending on the type of recording medium.

Even regarding whether or not the recording medium has been inserted in the paper path; that is, the waiting time until the recording medium is inserted, if a maximum time is not established, the host computer will wait indefinitely until it receives information from the printer that the recording medium has been inserted, thus preventing operation from going smoothly and resulting in lost time.

Further, POS printers include printers with differing paper paths for slip forms, validation forms, etc. In this kind of printer, ease of handling will vary depending on the paper path, that is, on the type of printing medium, and the suitable time for waiting until insertion of the recording medium for each type of recording medium, that is, the wait time until the occurrence of insertion of the recording medium is confirmed, or for waiting until completion of setting of the recording medium, that is, the wait time until automatic feed starts after insertion of the recording medium, will vary, and these wait times will also vary depending on the level of training of the operator.

OBJECTS OF THE INVENTION

Therefore, it is an object of the present invention to overcome the aforementioned problems.

In view of the fact that the orientation of the recording medium set in the printer will change due to various factors as described above, an additional object of the present invention is to provide a printer and its control method that will allow each operator to set the recording medium without any trouble, perform operation smoothly and without stress according to his or her level of training, and prevent lost time.

It is another object of the present invention to provide a printer and its control method capable of handling various types of recording medium having a corresponding wait time.

It is a further object of the present invention to provide a printer and control method when employing different recording medium types, without the operator having to manually reset the wait time each time the recording medium type is changed, automatically changes the wait time in accordance with the recording medium type.

SUMMARY OF THE INVENTION

According to an aspect of the present invention, a printer is capable of automatically feeding differing recording medium types inserted into the paper path after a preset wait time for subsequent printing. The printer comprises a memory section capable of storing wait times corresponding to each recording medium type, a setting section capable of setting or changing the wait times in this memory section, a control section capable of distinguishing the type of recording medium to be printed on and starting automatic feed based on the wait time corresponding to this type from among the wait times stored in the memory section.

According to another aspect of the present invention, a control method is provided for a printer capable of automatically feeding differing recording media inserted in the paper path for printing after a predetermined time. The method comprises a setting process capable of setting and changing the wait times corresponding to the various recording medium types in the memory section, and a feed process capable of distinguishing the type of recording medium to be printed on and for starting automatic feed based on the wait time in the memory section corresponding to the recording medium type.

In the printer and control method of this invention, the setting section or setting process makes it possible to set the wait time for each recording medium type that can be handled by the printer in the memory section and to change the wait times according to the level of experience of the operator. Since it is also possible to distinguish the type of recording medium by means of the control section or the feed process and start feeding after the wait time set in the memory section for that type of recording medium, it is possible to handle differing recording medium types according to suitable wait times. Further, in the printer and its control method of this invention, the wait time stored in the memory section can be changed according to the level of expertise of each operator, and therefore each operator can set the wait time to prevent any stress. Since it is also possible to set the wait time such that it is not unnecessarily long, printing operations can be performed smoothly and without wasting time. In addition, since the respective wait times for each recording medium type can be set in the memory section in advance, there is no need to reset the wait time each time the type of recording medium to be printed on is changed. Therefore, by means of the printer and its control method of this invention, once the wait times are set, recording media can be automatically fed after the appropriate wait time according to the recording medium to be printed on.

In the setting section or the setting process, it is possible to set at least one of the first wait time until insertion of the recording medium is confirmed and the second wait time from when the recording medium is inserted until automatic feed is started, and it is desirable to be able to change at least one of the first and second wait times. These first and second wait times are values that can differ depending on the paper path or recording medium size and on the operator's skill level. Therefore, by setting the first wait time or the second wait time and also setting both of these wait times such that they can be changed for each type of recording medium, it is possible to set an appropriate wait time that matches the recording medium, operator, printer setting locations and other various conditions with flexibility.

In the control section or feed process, it is possible to distinguish the type of recording medium to be printed on based on control commands received from the host computer, and it is also possible to distinguish the type of recording medium by distinguishing the paper path in which the recording medium is inserted when the recording media have different paper paths.

In the setting section or setting process, it is possible to receive dedicated setting commands containing the type of recording medium and wait time and to set the wait time for each recording medium type in the memory section, and it is also possible to receive the first and second wait time in one setting command. It is further possible to set the wait time for each recording medium type in the memory section by combining a general-use first setting command indicating the type of recording medium and a second setting command indicating the wait times. It is possible to receive the first and second wait times in differing setting commands, or the first and second wait times can be received in one setting command.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

DESCRIPTION OF THE PREFERRED EMBODIMENTS

Embodiments of the present invention are described in detail using the drawings.

Figure 1:
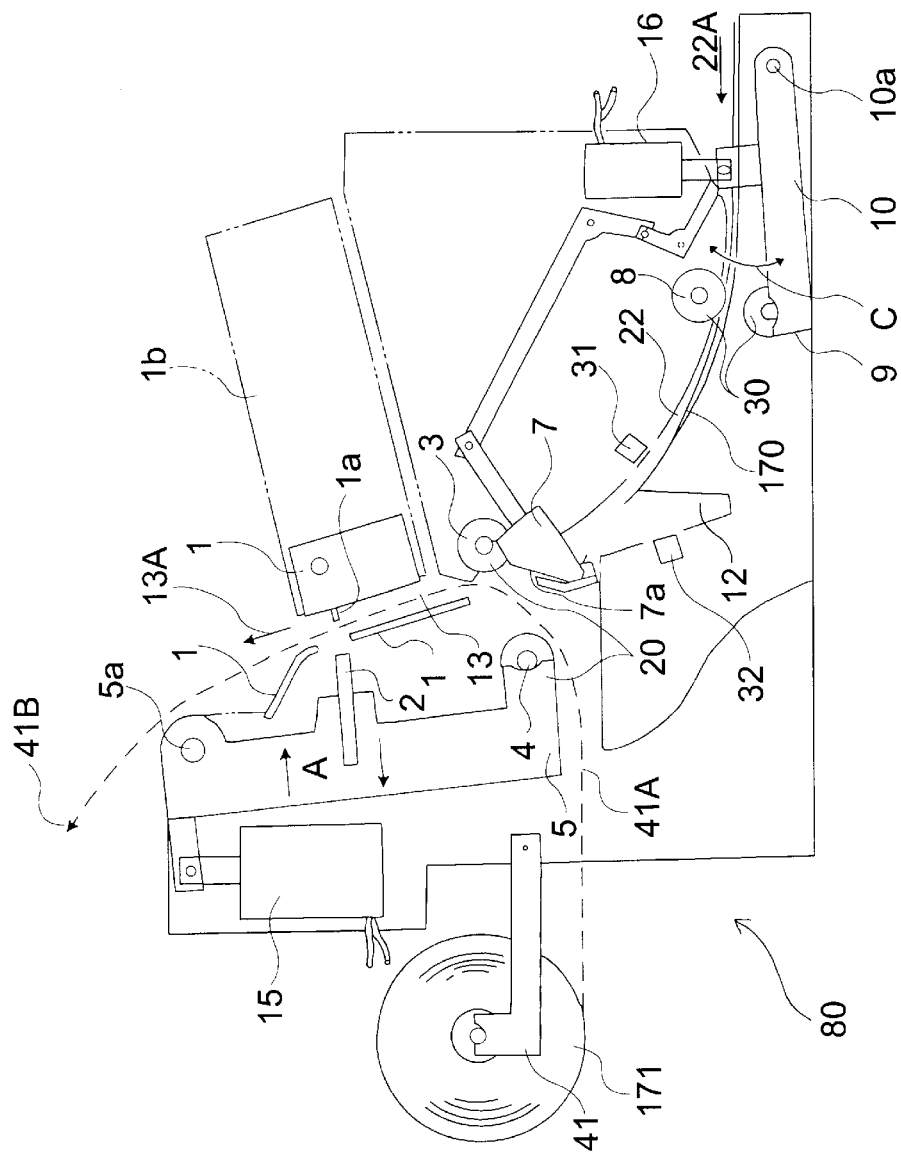
FIG. 1 shows a sketch of the general configuration of a printer in accordance with a preferred embodiment of the present invention.

FIG. 1 shows an example of the mechanism of printer 80. Printer 80 of this embodiment is capable of printing on a plurality of types of recording media including roll paper 171 and at least two types of cut sheets 170 (recording paper or recording forms). Printer 80 contains a printer section equipped with print head 1, a plurality of wire pins 1a for printing built into print head 1, and ink ribbon 1b, wherein platen 2 disposed opposite wire pins 1a for printing is mounted such that it is supported by support member 5 and can be rotated back and forth in the directions of arrows A and B around shaft 5a by plunger 15. The printer section open-close mechanism comprises mainly plunger 15 and support member 5, and recording paper feed mechanism 20 comprises, in addition to these, paper drive roller 3 and auxiliary roller 4 pressed against drive roller 3.

Printer 80 is also equipped with paper drive roller 8 for feeding the recording paper and auxiliary roller 9 disposed opposite thereto, and auxiliary roller 9 is mounted such that it is supported by support arm 10 and can be rotated in the direction of arrow C about pivot 10a by plunger 16. The feed section open-close mechanism comprises mainly plunger 16, auxiliary roller 9 and support arm 10, and recording paper feed mechanism 30 comprises, in addition to these, drive roller 8 and auxiliary roller 9.

Recording paper path 13 for cut sheets 170 is formed from recording paper guide plate 11 in the vicinity of print head 1, and print path 13 is configured such that at least two types of cut sheets, that is, a standard, thick validation form and a relatively large, nonstandard slip form, can be set in it. The locations where these differing types of cut sheets 170 are set differ in printer 80 of this embodiment, in that frame notch member 12 has been provided for setting validation forms, which separate from paper path 22 for slip forms. Frame notch member 12 has a structure that allows the insertion of standard, thick validation forms from the top of printer 80, that is from the shaft 5a side. Recording paper detection means (recording paper detection section) 32 for detection of insertion of validation forms is disposed in frame notch member 12, and in this embodiment a type of photo-reflector is employed. Further, recording paper detection means (recording paper detection section) 31 for detection of the insertion of recording paper is also disposed in paper path 22 for slip forms, and it also employs a type of photo-reflector as described above. Stopper 7 for insertion of cut sheets is disposed upstream from these insertion openings (toward print head 1), and it is configured such that it is linked to plunger 16 and can open and close the path for recording paper. Inclined surface 7a is formed on the top of stopper 7 such that stopper 7 is retracted by this inclined surface 7a when validation paper is inserted and abuts the inclined surface 7a.

Slip forms and other types of cut sheets 170 are inserted in the paper path from the direction of arrow 22A and are set in place in recording paper path 22 when they are pushed against stopper 7. The setting of the recording paper is detected by the reflection of the light beam of the photosensor, plunger 16 retracts which closes recording paper feed rollers 30, stopper 7 opens up the recording paper path, and then recording paper 170 is fed to the printing position by drive roller 8. After recording paper 170 is fed to the printing position by drive roller 8, plunger 15 retracts and causes recording paper 170 to be held by the drive roller 3 and auxiliary roller 4, and the recording paper can now be fed by drive roller 3.

Cut sheets are positioned by correctly pushing them against the stopper which is at the retraction location at the time of insertion, thus making it possible to reliably feed the recording paper in the correct position and orientation. As was described above, the time it takes to set the recording paper will vary depending on the level of training, and there are cases wherein problems result if feeding of the recording paper starts immediately after insertion of the recording paper is detected. Therefore wait time control is performed in the printer of this embodiment as described below.

Note that roll paper 171 is held by roll paper holder 41 in printer 80 of this embodiment, and roll paper 171 is ejected in the direction of arrow 41B along dotted line 41A.

Figure 2:
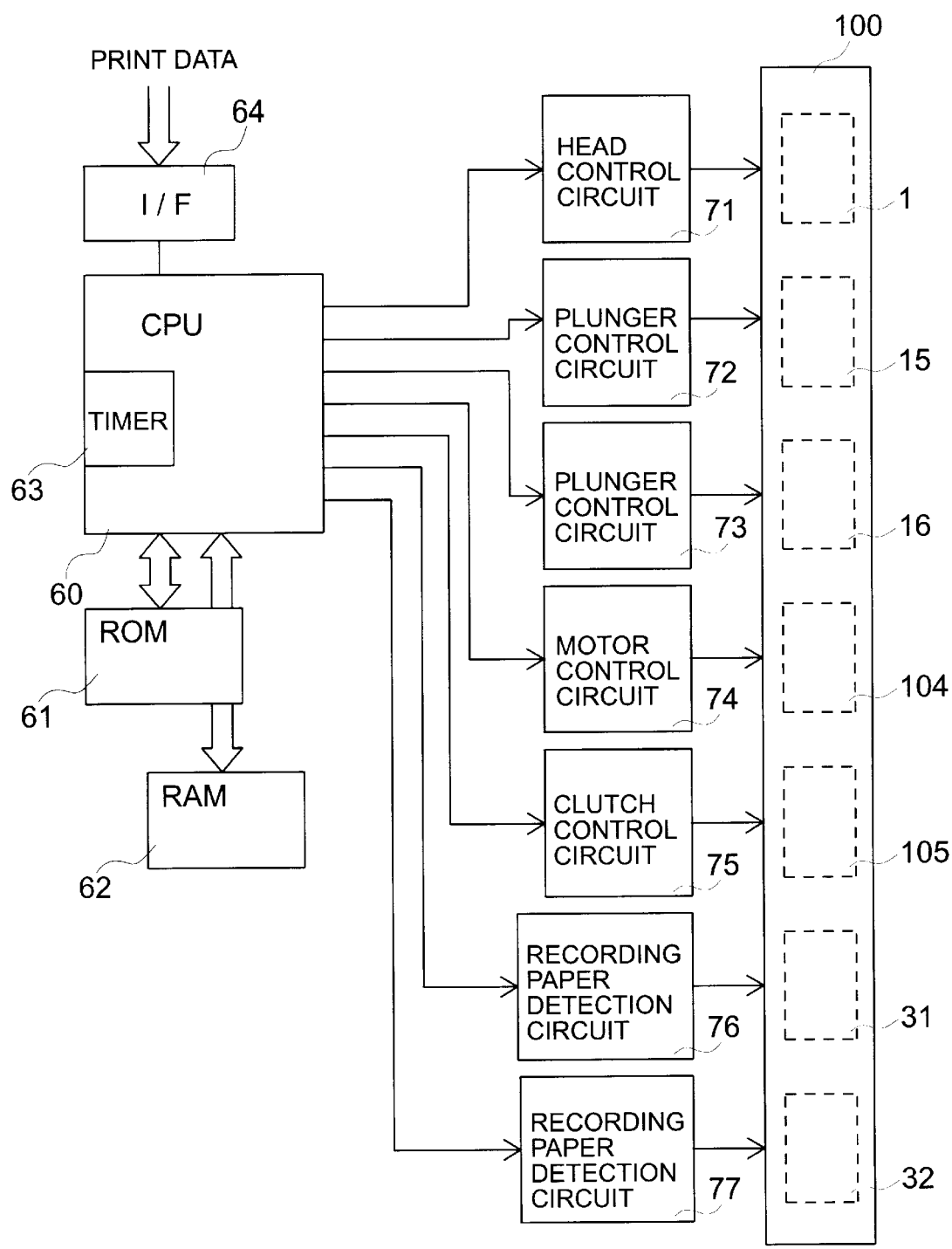
FIG. 2 is a block diagram showing the control circuit of the printer shown in FIG. 1.

FIG. 2 shows a block diagram of the control circuit that controls the mechanism of printer 80 of this embodiment. Printer device mechanism 100 contains print head 1, plungers 15 and 16, motor 104 which serves as the drive source for recording paper feed, etc., clutch 105, and recording paper detectors 31 and 32. This printer device mechanism 100 is basically controlled by CPU 60 which controls the entire printer, and it is connected to a memory, such as read only memory (ROM) 61, which stores the program, data etc., for controlling the entire printer, another memory, such as random access memory (RAM) 62, used to temporarily store data, timer 63 for measuring prescribed times, and interface 64 for receiving print data. Head control circuit 71, plunger control circuit 72, plunger control circuit 73, motor control circuit 74, clutch control circuit 75, recording paper detection circuit 76 for cut sheets and connected to the recording paper detector which detects the presence or absence of recording paper, and validation recording paper detector circuit 77. Also, CPU 60 receives print data and data containing control commands from an external device, such as a computer (not shown), coupled to host via interface 64. CPU 60 then analyzes this data controlling printer device mechanism 100 and executes the prescribed printing based on the data received.

Figure 3:
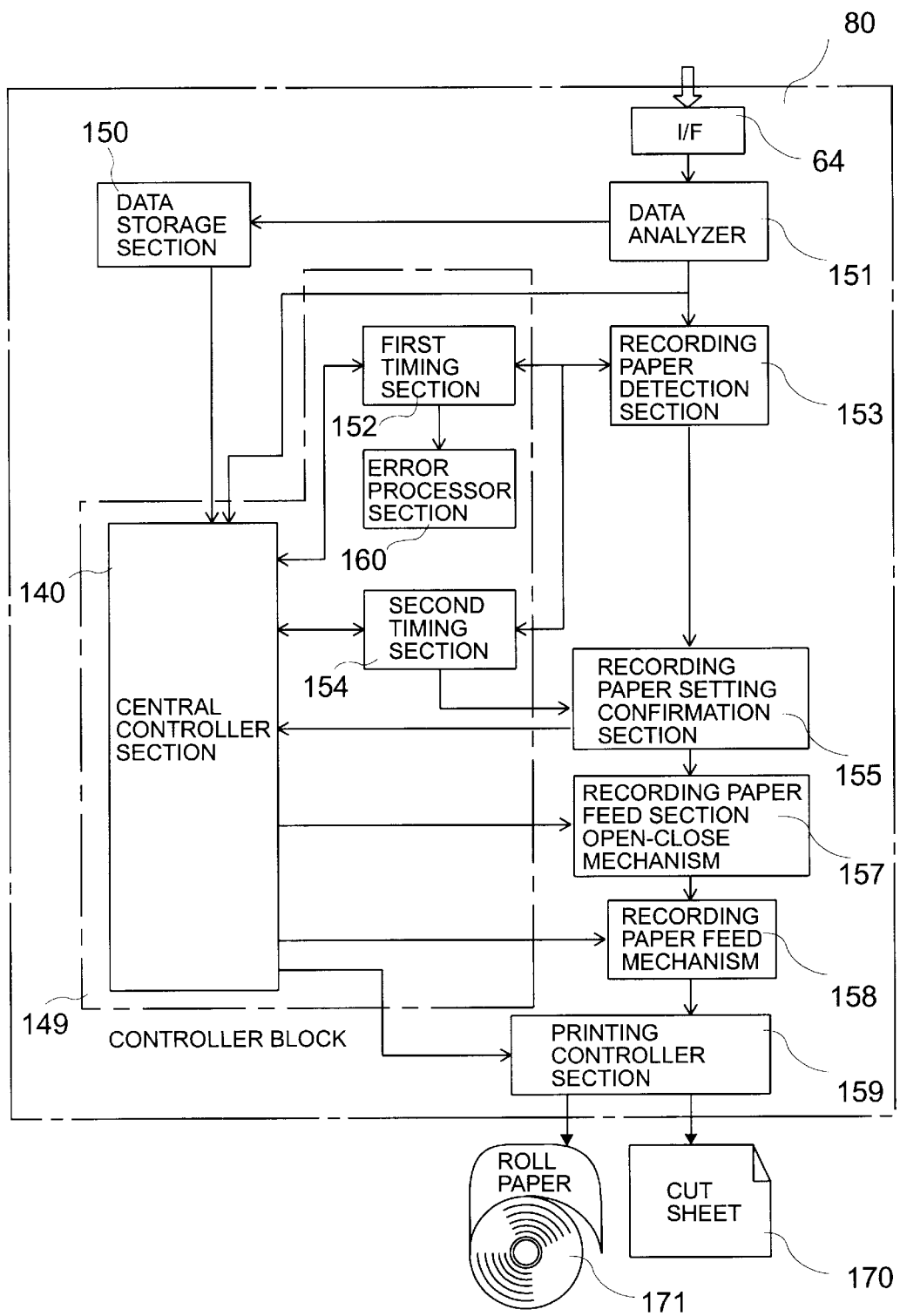
FIG. 3 is a functional block diagram showing the control system of the printer shown in FIG. 1.

FIG. 3 shows a functional block diagram of printer 80 of this embodiment. The data input to interface 64 is analyzed by data analyzer 151 and is stored in a prescribed area of data storage section 150, that is, RAM 62 which is a type of storage device. If there are commands in this received data for a cut sheet wait time or insertion wait time, these settings are also stored in RAM 62. Therefore, in printer 80 of this embodiment, data analyzer 151 can function as a setting section and can store the wait time designated by the setting command in data storage section 150 having a memory function for each of the plurality of recording medium types whose paper paths and printing conditions differ.

Data analyzer 151 is realized by CPU 60 and its control program. Specifically, CPU 60 analyzes received data according to so-called received interrupt requests from interface 64. It can also store received data in RAM 62 and analyze it later by a predetermined priority.

If the received data includes print data, then printing is performed after waiting for insertion of the recording paper corresponding to the cut sheet or validation form previously selected by the control command. Printer 80 of this embodiment only waits for insertion of the recording medium for the prescribed time (insertion wait time or first wait time), and when the recording medium has been inserted it only waits a second prescribed time (setting wait time or second wait time) and then starts feeding the recording medium. For this reason, it is equipped with recording paper detection section 153 (corresponds to recording paper detectors 31 and 32 at the insertion openings of the respective paper paths in this embodiment) which detects insertion of the recording paper and recording paper setting confirmation section 155 (continuously detected by recording paper detectors 31 and 32 after a prescribed time has elapsed or until a prescribed time elapses in this embodiment), and controller 149 is equipped with first timing section 152 which counts the insertion wait time and second timing member 154 which counts the setting wait time using timer 63. CPU 60 or other central controller section 140 reads the prescribed parameters from data storage section 150 corresponding to the type of recording medium to be printed on, processes these and converts them to time data whereby it operates first timing section 152. This processing may be performed by data analyzer 151 when processing data. In this case, time data are stored in data storage section 150. Recording paper detection section 153 waits for insertion of corresponding recording paper while operation of the timing section. When insertion of the recording paper is detected, central controller section 140 reads out the setting wait time from data storage section 150 corresponding to the type of recording medium in the same way as described above and starts operation of second timing section 154 which has been set. The wait time data set in first and second timing sections 152 and 154 are stored in a prescribed area of data storage section 150 such that they correspond to the types of recording media whose recording paper path, etc., differ. Further, the timing sections comprise the timer built into CPU 60.

When recording paper setting confirmation section 155 confirms that the recording paper has been properly set, that is, when the recording medium is continuously detected in the paper path during the setting wait time, recording paper feed section open-close mechanisms 157 each realized from mainly plunger 15 or 16 in paper path 22 or 13 corresponding to the recording medium, auxiliary roller 4 or 9 and support arm 5 or 10, and recording paper feed mechanisms 158 each realized from recording paper feed mechanism 20 or 30 operate and feed the recording medium to printing controller section 159 equipped with print head 1, etc., as described above where printing on cut sheet 170 is performed in sequence. If the insertion wait time or setting wait time for the recording paper has not been set by a command, a preset default value set in data storage section 150 is used.

If recording paper is not detected by the time the prescribed measurement time has elapsed in first timing section 152 which measures the insertion wait time of the recording paper, then error processor section 160 issues a warning indicator or buzzer to indicate a recording paper setting error. In addition to this error processing or in place of this error processing, the information to be printed on cut sheet 170 may be printed on roll paper 171. By this means, the printer does not wait for insertion of the recording medium indefinitely, but rather it notifies the operator at an appropriate time and moves the printing procedure forward to avoid lost time. Therefore, in printer 80 of this embodiment, times suitable to each operator and each recording medium can be set such that the timing whereby the operator is warned by a warning indicator or buzzer is not too early so as to cause the operator stress, while the wait time is not so long so as to waste time.

Normally, a recording paper setting process is not necessary for roll paper 171, and therefore when roll paper is selected by a control command, printing controller section 159 executes printing immediately based on print data analyzed by data analyzer 151.

Figure 4:
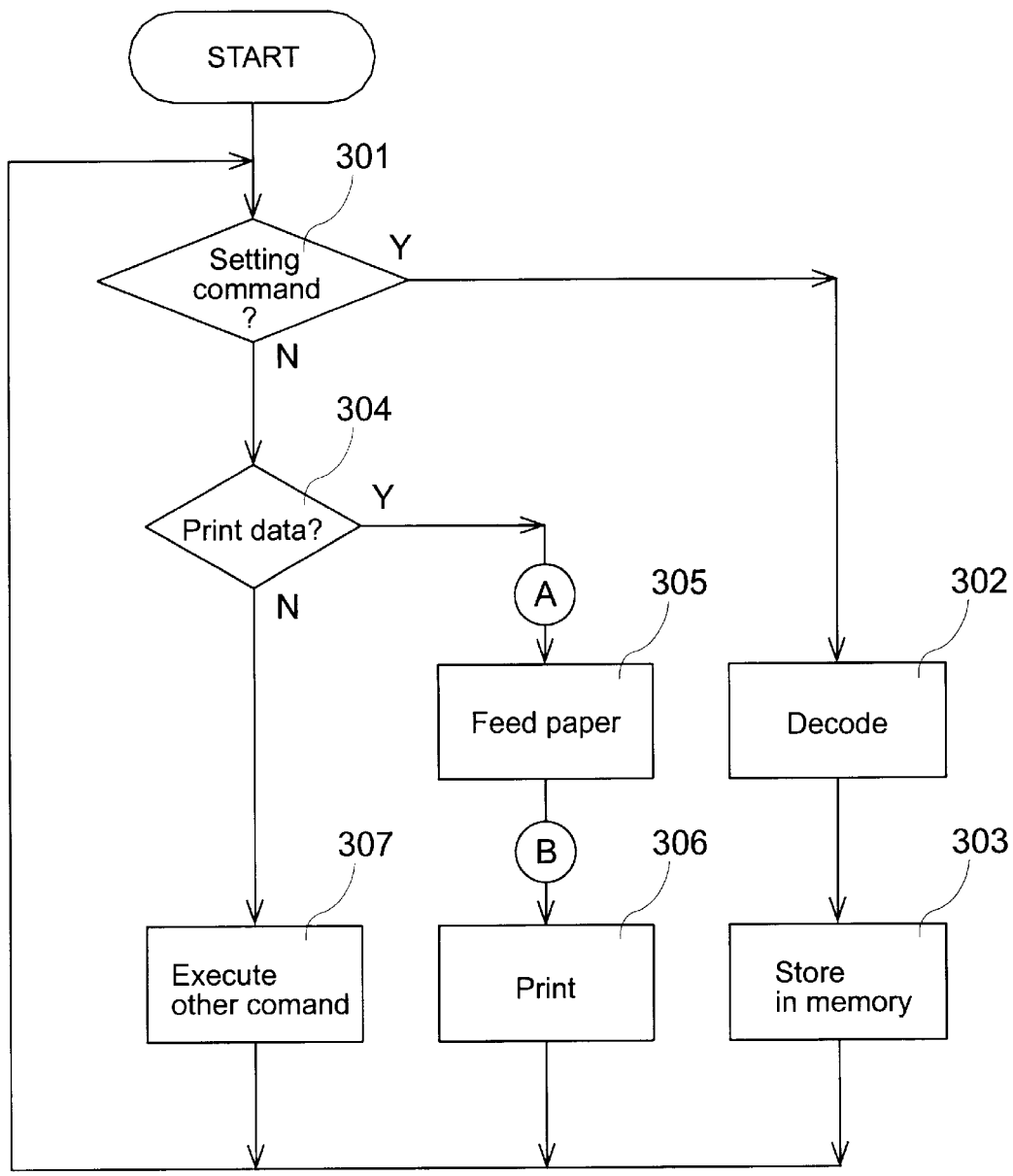
FIG. 4 is a flowchart showing a summary of the processing in the printer shown in FIG. 1.

FIG. 4 shows the control method of printer 80 of this embodiment. First, when the command received by data analyzer 151 is interpreted as a command that sets the wait time in step 301, the contents of the command are decoded and the type of recording medium, insertion wait time and setting wait time sent by the command are distinguished in step 302. In step 303, the data for the insertion wait time and setting wait time corresponding to the specified recording medium type are set in data storage section 150, which is memory (memory device). Even though this insertion wait time and setting wait time are set, subsequent changes can be freely performed by specifying them with commands from the host. The setting command of printer 80 of this embodiment is as follows.

$$\text{ESC g m n} \tag{1}$$

This setting command is an example of a command capable of setting the type of recording medium, the insertion wait time of the recording paper, and the setting wait time until recording paper feed starts or printing starts after insertion with the same command code, where ESC g indicates the type of command, and when this code is read by command analysis means (data analyzer) 151, it is interpreted as the recording paper insertion wait time and setting time set command. Of the parameters consisting of at least two bytes following this, the upper two bits of the first parameter "m" are used to specify types of recording media with differing recording paper paths, and the lower 4 or 6 bits indicate the setting for the insertion wait time of the recording paper. For example, it is possible to set the insertion wait time in 1-minute units. That is, the set time becomes m×1 minutes. The next parameter "n" indicates the setting of the setting wait time until feeding of the recording paper or printing is started after insertion is detected, and as an example the setting wait time can be set in 0.1-second units. Therefore, the set time becomes n×0.1 sec. Also, if the upper 2 bits are 10 in binary code, then they could be used for the setting of the wait time for a slip form, or if they are 01 in binary code, then they could be used for the setting of the wait time for a validation form in the method whereby the type of recording medium is specified.

The actual time of the wait time based on these parameters is sought using the time unit determined in advance by central controller section 140 equipped with an operation function centered around CPU 60 and is measured by the timer 63 built into CPU 60. Also, m=0 and n=10 are used as default values. When m=0, control is performed such that the wait time is unlimited. Further, not only can timer 63 built into CPU 60 be used as the means for measuring time, it is also possible to configure the means from a delay time using software. We configured the above parameters using one byte each, but two or more bytes can be used as required.

It is also possible to use the following kinds of commands as setting commands for wait times.

$$\text{ESC c1 k}$$
$$\text{ESC f m n} \tag{2}$$

These commands each set the type of recording medium, the insertion wait time and the setting wait time, where the first command "ESC c1" indicates the type of control command, and when this code is read by data analyzer 151, the code is interpreted as a selection command for the recording medium for which the wait time and other control variables are to be set. The "k" following this indicates a setting for setting the recording paper, and as described above, if 10 in binary code is used, then it can define the wait time setting for a slip form, and if 01 in binary code is used, then it can define the wait time setting for a validation form.

When the control command that specifies the wait time is received following the above paper designation process, the printer of this embodiment stores the specified wait time in an area of memory 150 corresponding to the designated paper. In this embodiment, the control command that specifies the insertion wait time and the setting wait time is "ESC f m n." "ESC f" indicates the control command that specifies the insertion wait time and the setting wait time, and the "m" following this indicates the setting for the insertion wait time. Also, the "n" indicates the setting for the setting wait time. The values for m and n can be set as the same manner as described above. Note that it is also possible, of course, to specify the insertion wait time and setting wait time using respectively different commands.

By providing control commands separately like this that select the recording medium for which control variable settings are to be performed, the procedure for storing control variables other than wait time can be simplified such as when setting the line height.

When printer 80 receives print data and not a wait time setting command, that is determined in step 304, feed processing is performed in step 305 according to the wait time set in the memory and printing is performed following this in step 306. These are explained in further detail below. When printer 80 receives another command that is not a wait time setting command or a print data, then processing corresponding to that command is performed in step 307.

Figure 5:
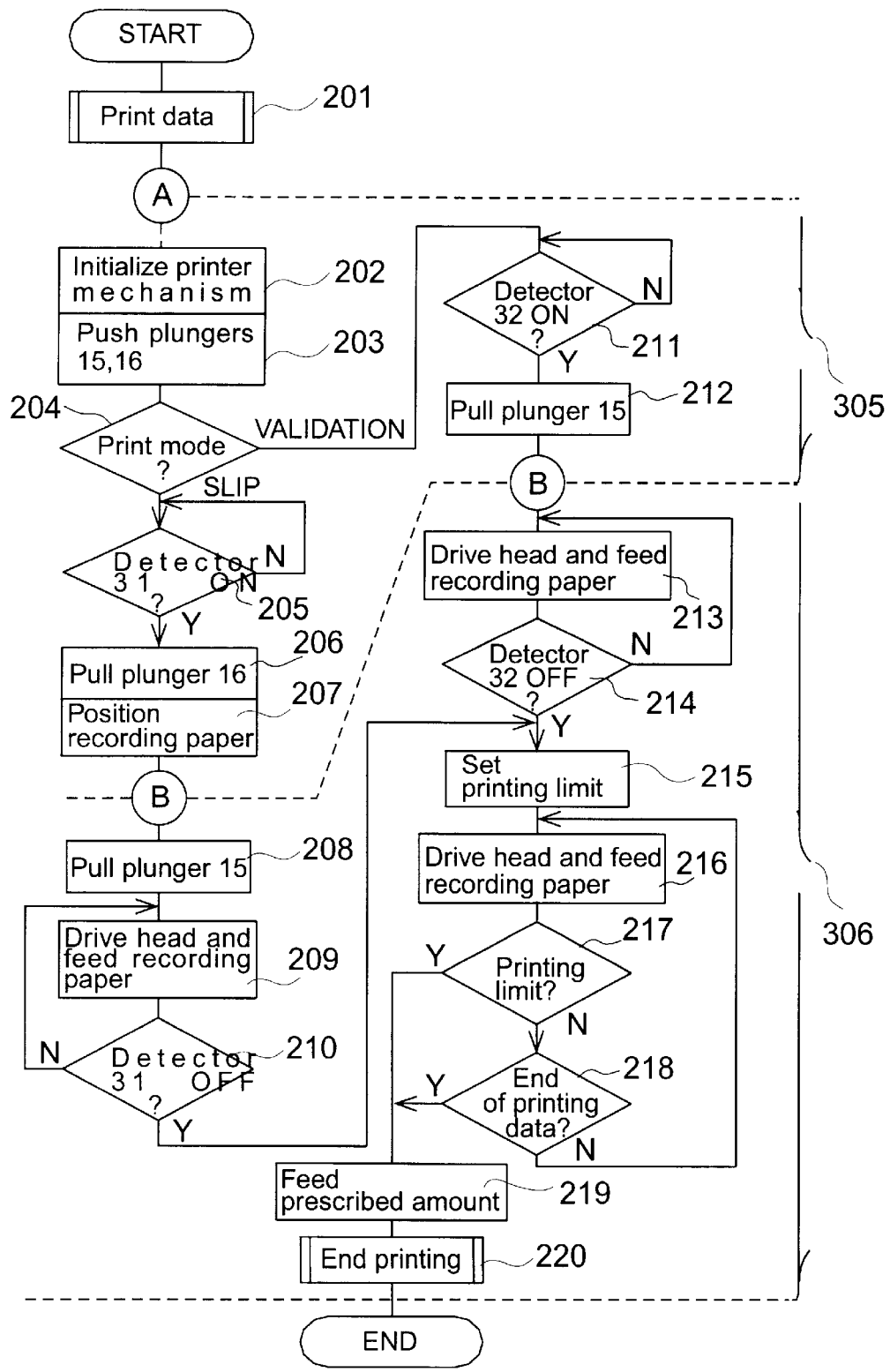
FIG. 5 is a flowchart showing an outline of the printing processing shown in FIG. 4.

FIG. 5 shows the processing performed in paper feed process 305 and printing process 306 of printer 80 of this embodiment in greater detail. First, the print command is received in step 201 and the print data are stored in RAM 62 at the same time. The initialization of the printer device mechanism is performed in step 202, wherein plungers 15, 16 go to an extended or push condition and the printing section and recording paper path are released (step 203). The control command is analyzed in step 204 and the print mode, i.e. recording paper, is selected. If a slip form of standard width is selected to be printed on, then the slip mode is set in step 205. If a validation form is selected, then the validation form is set in step 211.

In the slip mode, the level of detector 31 for detecting whether the recording paper has been set or not is checked and processing waits until it comes on. When the detector comes on indicating the recording medium has been detected, plunger 16 goes to a retracted or pull condition in step 206 retracting form stopper 7 which closes off the recording paper path, thus allowing the recording paper to be fed. Recording paper 170 is fed to the printing section in step 207 and is positioned. Plunger 15 goes to a retracted or pull condition in step 208, thus closing the printing section and enabling printing. From here, the position where the end of recording paper 170 passes the detector is confirmed (step 210) while driving the print head and feeding the recording paper (step 209). When the detector turns off, the amount the recording paper is fed up to the printing limit is stored at a prescribed address in RAM, and head drive and recording paper feed are continued and printing is performed while subtracting this amount in sync with recording paper feed until the end of the printing data or the printing limit is reached (steps 216, 217, 218). In step 219, the recording paper is fed a prescribed amount and is ejected from the printer, and the printing operation is completed in step 220.

In the validation mode, processing waits for the recording paper to be set in step 211 as in the slip mode, and once it is set, plunger 15 goes to the retracted or pull condition in step 212. Stopper 7 has inclined surface 7a on top, and therefore when a validation form is inserted from above, this structure of stopper 7 causes it to be removed from the paper path rather than restrict the validation form, thus eliminating the need to retract plunger 16. When the form is inserted all the way to the bottom position of notch section 12 in the validation mode, it is usually designed that the printing start position is positioned at the print section, and therefore it is not normally necessary to perform a positioning operation of the recording paper and only feeding the recording paper in response to form feed (FF) and other recording paper feed codes included in the print data. In steps 213 and 214, head drive and recording paper feed are continued until the detector turns off and the end of the recording paper is detected, and the remaining processing is the same as in the slip mode. However, the value for the printing limit set in step 215 can be a differing value corresponding to each recording medium.

Figure 6:
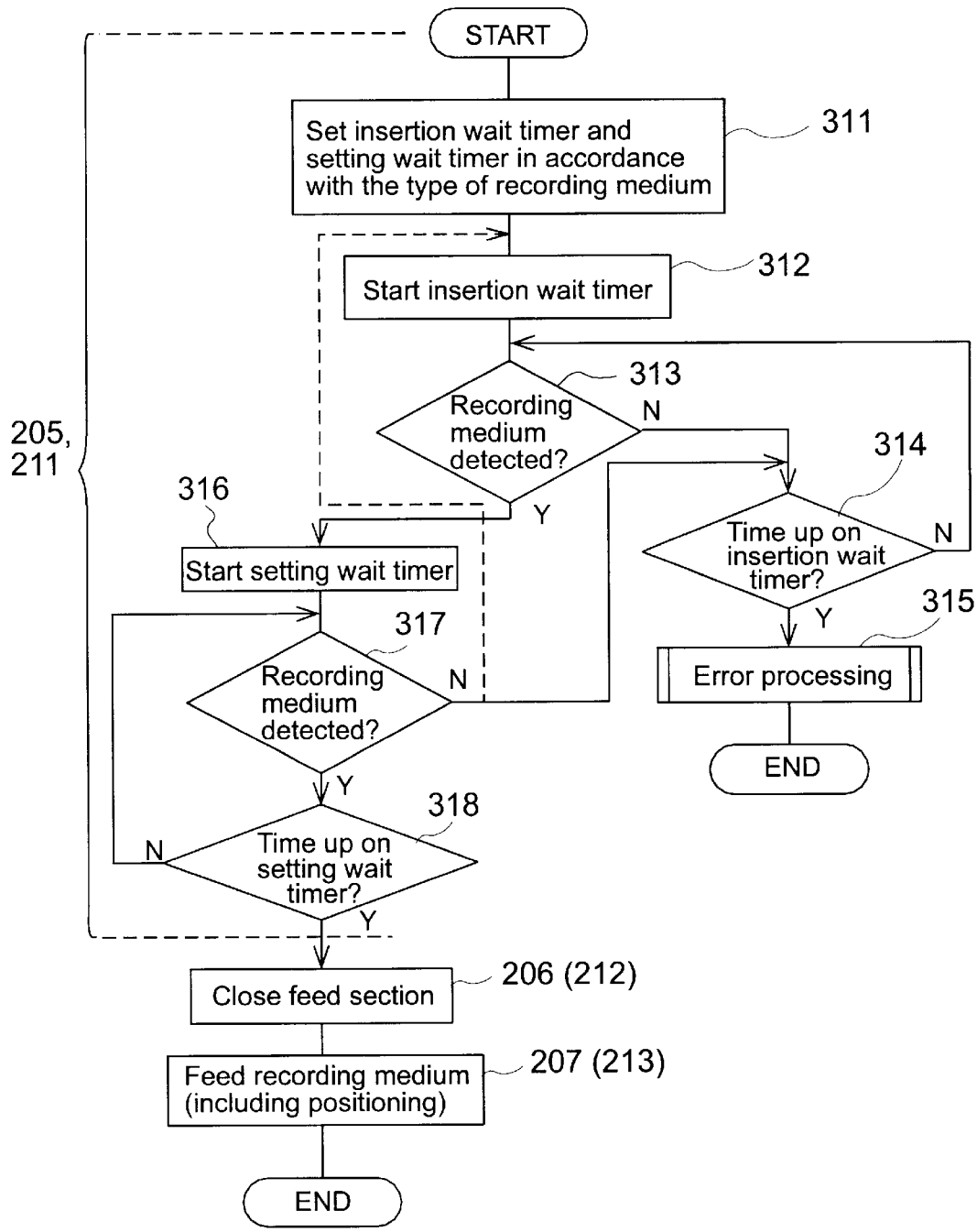
FIG. 6 is a flowchart showing the processing that feeds the paper shown in FIG. 4 in greater detail.

FIG. 6 shows the processing for the insertion and setting of the recording medium in further detail. This processing is a detailed explanation of steps 205 and 211 in the entire flowchart shown in FIG. 5, and since the processing for both is the same, it is shown using only one flowchart. First, in step 311, the wait times for the selected recording medium type are set from among the insertion wait times and setting wait times stored for every recording medium types in data storage section 150 in the insertion wait timer (first timing section 152 shown in FIG. 3) and the setting wait timer (second timing section 154 shown in FIG. 3) according to the recording medium type to be printed on as determined in step 204. The insertion wait timer is started in step 312. When the detector that detects the insertion of the recording paper comes on as the insertion of the recording medium in its corresponding paper path is detected in step 313, the setting wait timer is started in step 316.

In order to prevent misoperation of the detector due to noise or chatter when judging whether or not the recording medium was detected while waiting for insertion, etc., the state of the detector is confirmed again after a delay of several milliseconds once the detector confirms the presence of a recording medium.

In printer 80 of this embodiment, monitoring is continuously performed in step 317 to ensure the recording medium is being detected while measuring the setting wait time, and if the recording medium is no longer detected during this setting wait time, then processing proceeds to step 314 where timing by the insertion wait timer is monitored. This control method judges insertion time-out as the reference for determining whether or not the recording medium has been properly set. If the recording medium is no longer detected during the setting wait time, processing proceeds to step 312 where the insertion wait timer is reset and it becomes possible to restart the count. This control method judges insertion wait time-out as a reference for whether or not the recording medium was inserted at all. In either case, if the insertion wait time exceeds the prescribed time, printing processing is required to be abandoned, and therefore the operator is notified by executing error processing such as a warning indicator as described above.

When the recording medium continues to be detected in step 317 during the setting wait time, however, plunger 16 is operated as described above in step 206 (212) and closes the feed section, and then feeding of the recording medium is started in step 207 (213). If the operator sets the recording medium in the prescribed correct position and orientation for printing during this setting wait time, it is possible to set a suitable time for each operator that is neither too long nor too short. Further, since the appropriate wait time is automatically set by the type of recording medium specified for printing, the following processing starts after the printer waits an appropriate wait time without the operator being aware or performing the operation each time printing is performed.

In this embodiment, the paper path will differ depending on the types, and this invention is described using an example of a printer capable of printing on recording media supplied to one printer section, but printers have appeared in recent years wherein a plurality of printer units are disposed in one housing, where one is used to print journals on thermal paper and the other is used for cut sheets in order to print on regular paper. In this kind of printer for POS applications, etc., data are received via one interface and these data are used in common for control, and by applying this invention, it is possible to set the insertion wait times or setting wait times for thermal paper and regular paper according to the level of experience of the operator.

As described above, by means of the printer and its control method of this invention, it is possible to freely set the wait time for setting the recording medium in the paper path, e.g., the insertion wait time that waits for insertion of the recording medium and the setting wait time that waits for the recording medium to be set in the prescribed position, for each type of recording medium with differing paper paths or differing paper thicknesses or sizes. Further, once the wait time is set in the storage memory section, the wait time corresponding to the type of recording medium selected by the control command is automatically used and the printer waits for the operator to insert the recording medium or set it in the correct position within that wait time, and then printing starts. Therefore, it is possible to offer a printer and its control method capable of setting the wait time according to the level of experience of the operator, the ease of use of the recording medium or the installation circumstances of the printer, thereby greatly contributing to improvement of operating efficiency without putting stress on the operator.

Further, since the wait times can be set via commands from the host computer, it is possible to set them according to the work place or level of experience of the operators; e.g., even in a supermarket where there are a number of cash registers in a line, this invention is extremely useful because it permits settings corresponding to the level of experience of the operator of each register.

Further, since it is also possible to set the insertion wait time of the recording paper in this invention, the computer will not wait indefinitely if insertion of the recording paper is not performed within the prescribed time, thus allowing it to change to another operation. This raises the operating efficiency of the host computer in the event many POS terminals are controlled by one host computer. It is also possible to perform processing that issues a warning when insertion of the recording paper is late. Since it is also possible to flexibly set these insertion wait times according to the level of experience of the operators and other conditions as with the setting wait time, the invention is extremely useful.

Further, since the recording medium and the insertion wait time and setting wait time for the recording medium can be set using the same command, it is easy to perform settings from the host computer.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A printer capable of printing on a plurality of different types of recording medium, said printer comprising:

a recording medium transportation path to transport a recording medium;

at least one recording medium detector to detect a presence of the recording medium in said recording medium transportation path;

an interface to receive first predetermined times each corresponding to each of the recording medium types from a host device;

a first memory to store the first predetermined times;

a first recording medium selector to select the type of recording medium to be transported by said recording medium transportation path; and a controller which controls handling of said recording medium based at least on the first predetermined time retrieved from said first memory corresponding to the recording medium type selected by said first recording medium selector and an output of said at least one recording medium detector.

2. A printer according to claim 1, wherein said controller comprises a transportation controller which starts said recording medium transportation path when the first predetermined time retrieved from said first memory and corresponding to the selected recording medium type selected by said first recording medium selector elapses after said recording medium detector has detected the presence of the recording medium.

3. A printer according to claim 2, wherein said interface receives second predetermined times each corresponding to each of the recording medium types, wherein said printer further comprises:

a second memory to store the second predetermined times; and a recording medium waiting controller to terminate waiting for the recording medium to be set in said recording medium transportation path if said recording medium detector does not detect the presence of said recording medium before the second predetermined time retrieved from said second memory and corresponding to the selected recording medium type selected by said first recording medium selector elapses from when recording medium waiting starts.

4. A printer according to claim 1, wherein said recording medium detector is provided corresponding to each recording medium types, and said first recording medium selector selects the type of recording medium in accordance with said recording medium detector which detects the presence of the corresponding type of recording medium.

5. A printer according to claim 1, further comprising a memory controller, wherein said first memory is responsive to said memory controller.

6. A printer according to claim 5, further comprising a second recording medium selector for selecting a recording medium type for which the first predetermined time is stored in said first memory in accordance with said memory controller.

7. A printer according to claim 1, wherein said interface comprises a data interpreter to interpret data received from the host device, wherein said data interpreter outputs first recording medium selection information in accordance with a first predetermined data received from the host device, and wherein said first recording medium selector selects a type of recording medium in accordance with the first recording medium selection information output by said data interpreter.

8. A printer according to claim 7, further comprising:

a second recording medium selector to select a recording medium type for which the first predetermined time is to be stored in said first memory; and a memory controller to control said first memory to store the first predetermined time stored in said first memory and corresponding to the type of said recording medium selected by said second recording medium selector;

wherein said data interpreter outputs second recording medium selection information in accordance with a second predetermined data received from the host device, and wherein said second recording medium selector selects a recording medium type in accordance with the second recording medium selection information output by said data interpreter.

9. A printer according to claim 8, wherein the data interpreter outputs a time value to be stored in said first memory in accordance with a third predetermined data received from the host device, and wherein said memory controller controls said first memory to store the first predetermined time based on the time value output by said data interpreter.

10. A printer according to claim 9, wherein the second and the third predetermined data are included in a single command.

11. A printer according to claim 9, wherein each of the second and the third predetermined data belongs to a command independent from each other.

12. A printer according to claim 1, wherein said controller comprises a recording medium waiting controller to terminate waiting for the recording medium to be set in said recording medium transportation path if said recording medium detector does not detect the presence of the recording medium before the predetermined time retrieved from said first memory and corresponding to the selected recording medium type selected by said recording medium selector elapses from when recording medium waiting starts.

13. A control method for a printer capable of printing on a plurality of different types of recording medium, the control method comprising the steps of:

detecting a presence of the recording medium in a recording medium transportation path;

receiving first predetermined times each corresponding to each of the recording medium types from a host device;

storing the first predetermined times;

selecting a first type of recording medium to be transported; and controlling recording medium handling based at least on the first predetermined time stored in said storing step corresponding to the recording medium type selected in the recording medium selection step and the detection result in the detection step.

14. A control method according to claim 13, the controlling step comprising the step of starting recording medium transportation when the first predetermined time corresponding to the selected recording medium type selected in the recording medium selection step elapses after presence of the recording medium has been detected in the detection step.

15. A control method according to claim 14, further comprising the steps of:

(1) receiving second predetermined times each corresponding to each of the recording medium types;

(2) storing the second predetermined times; and (3) terminating waiting for the recording medium to be set in the recording medium transportation path if the presence of the recording medium is not detected in the detection step before the second predetermined time stored in step (2) corresponding to the selected recording medium type selected in the selection step elapses from when recording medium waiting starts.

16. A control method according to claim 13, wherein the detection step comprises the step of detecting each recording medium types, and wherein the first type selection step comprises the step of selecting the first type of recording medium in accordance with the type of recording medium of which the presence is detected in the detection step.

17. A control method according to claim 13, further comprising the setting/changing step of at least one of setting and changing the first predetermined times stored in the storing step.

18. A control method according to claim 17, further comprising the second selecting step of selecting a second type of the recording medium, wherein the setting/changing step comprises the step of at least one of setting and changing the first predetermined time corresponding to the second type of recording medium selected in the second selecting step.

19. A control method according to claim 13, wherein the receiving step comprises the step of interpreting data received from the host device, wherein the interpreting step comprises the step of outputting first recording medium selection information in accordance with a first predetermined data received from the host device, and wherein the first type selection step comprises the step of selecting the first type of recording medium in accordance with the first recording medium selection information output in the first information outputting step.

20. A control method according to claim 19, further comprising the steps of:

selecting a second type of recording medium for which the first predetermined time is to be at least one of set and changed; and at least one of setting and changing the first predetermined time stored in the storing step and corresponding to the second type of the recording medium selected in the second type selection step;

wherein the interpreting step comprises the step of outputting second recording medium selection information in accordance with a second predetermined data received from the host device, wherein the second type selection step comprises the step of selecting the second type of recording medium in accordance with the second recording medium selection information output in the second information outputting step.

21. A control method according to claim 20, wherein the interpreting step comprises the step of outputting a time value to be at least one of set to and changed with as the first predetermined time stored in the storing step in accordance with a third predetermined data received from the host device, and wherein the storage at least one of setting and changing step comprises the step of at least one of setting and changing the first predetermined time based on the time value output in the time value outputting step.

22. A control method according to claim 13, the controlling step comprising the step of terminating waiting for the recording medium to be set in the recording medium transportation path if the presence of the recording medium is not detected in the detection step before the predetermined time stored in the storing step and corresponding to the type of recording medium selected in the selection step elapses from when recording medium waiting starts.

* * * * *